(12) United States Patent
Brock et al.

(10) Patent No.: US 12,039,401 B2
(45) Date of Patent: Jul. 16, 2024

(54) METHODS AND APPARATUS FOR PROVIDING OUT-OF-RANGE INDICATIONS FOR IMAGING READERS

(71) Applicant: ZEBRA TECHNOLOGIES CORPORATION, Lincolnshire, IL (US)

(72) Inventors: Christopher W. Brock, Manorville, NY (US); Yuri Astvatsaturov, Lake Forest, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/389,218

(22) Filed: Nov. 13, 2023

(65) Prior Publication Data

US 2024/0078397 A1 Mar. 7, 2024

Related U.S. Application Data

(62) Division of application No. 17/145,942, filed on Jan. 11, 2021, now Pat. No. 11,816,529.

(51) Int. Cl.
*G06K 7/14* (2006.01)
*G06K 7/10* (2006.01)

(52) U.S. Cl.
CPC ....... *G06K 7/1417* (2013.01); *G06K 7/10881* (2013.01); *G06K 7/1413* (2013.01)

(58) Field of Classification Search
CPC ............. G06K 7/1417; G06K 7/10881; G06K 7/1413; G06K 7/10712
See application file for complete search history.

(56) References Cited

U.S. PATENT DOCUMENTS

| 4,877,949 A * | 10/1989 | Danielson | H01Q 3/245 235/462.21 |
| 2005/0258252 A1* | 11/2005 | Winter | G06K 7/0008 235/472.02 |

* cited by examiner

*Primary Examiner* — Matthew Mikels
(74) *Attorney, Agent, or Firm* — Yuri Astvatsaturov (57) ABSTRACT

Methods and apparatus for providing out-of-range indications are disclosed. An example imaging reader includes an image sensor and an optical assembly. The imaging reader may include a distance determining module configured to determine a distance to a target. The imaging reader may include an indication determining module configured to determine an out-of-range indication when the distance satisfies a first condition. An indicator may be included and configured to present the out-of-range indication. The image sensor may be configured to capture a representation of an image of the target when the distance satisfies a second condition. The imaging reader may include an indicia decoder configured to decode an indicia in the representation to determine an indicia payload and/or a communication interface to convey the indicia payload to a host system.

7 Claims, 3 Drawing Sheets

METHODS AND APPARATUS FOR PROVIDING OUT-OF-RANGE INDICATIONS FOR IMAGING READERS

CROSS-REFERENCE TO RELATED APPLICATION(S)

The present application is a divisional of U.S. patent application Ser. No. 17/145,942 filed on Jan. 11, 2021, and incorporated herein by reference in its entirety.

BACKGROUND

Solid-state imaging readers (e.g., barcode readers, etc.) have long been used, in both handheld and hands-free modes of operation, in many industries, such as machine vision, retail, manufacturing, warehousing, distribution, postal, transportation, logistics, etc., to electro-optically read targets, such as one- or two-dimensional barcode symbols, direct product marks (DPMs) indelibly formed on objects, etc. to be decoded. Imaging readers generally include an imaging assembly, among other assemblies, modules, etc. that are mounted in a housing. An imaging assembly generally includes a solid-state image sensor with an array of photocells or light sensors, and an optical assembly for capturing return illumination light scattered and/or reflected from a target in a field of view (FOV) centered on an imaging axis, and forming images of the target on the image sensor. In some instances, the optical assembly includes autofocus components for adjusting optical components of the optical assembly to focus images of the target on the image sensor. The image sensor produces electrical signals representing image frames of the images of the target on the image sensor. The image frames may be processed, for example, by a programmed microprocessor or controller, to identify contents, which may be further processed to identify barcodes, DPMs or other indicia. The barcodes, DPMs or other indicia may be decoded (e.g., by the controller or a decoder) to obtain information related to, for example, a target being read (e.g., decoded data identifying the target). The controller is operative for transmitting the decoded data, either via a wireless or wired link, to a remote host for further processing, e.g., price retrieval from a price database to obtain a price for the identified target. Some imaging readers include an illumination system for emitting illumination light toward the target for reflection and scattering therefrom, and/or an aiming light system for projecting a visible aiming light pattern. The visible aiming light pattern may be provided to visually aid a user when, for example, the user is positioning and/or aiming an imaging reader and/or positioning a target so the target falls within the imaging reader's FOV (e.g., in a central region of the FOV).

Because of the physics involved, an optical assembly can only be focused over a range of working distances, that is, over a working range. Likewise, for optical assemblies not including autofocus, their range of working distances, or working range, is the range of distances over which they are capable of capturing images with an acceptable intended image quality (e.g., resolution, contrast, etc.). The working range is a design parameter that influences the size and/or cost of the optical assembly. The size and/or cost of an optical assembly capable of focusing from and/or capturing images with an acceptable intended image quality at extremely close distances (e.g., two inches for reading DPMs) to very far (e.g., 200 inches for warehouse applications) is typically driven more by the close focus and/or imaging requirements. Being capable of focusing and/or capturing imaging with an acceptable intended image quality at typical DPM ranges (e.g., one-half to one and a half inches) may result in a prohibitively large optical assembly, a prohibitively expensive optical assembly, and/or an optical assembly that cannot focus on and/or image objects with an acceptable image quality far enough away. A possible solution is to shift the overall lens design to being able to focus and/or image closer at the expense of far distance capability, which may not meet product requirements. Attempting to image a target outside the working range can be problematic. For example, leading to an inability to focus on the target and/or capture an image of the target with an acceptable image quality. In such circumstances, an operator of the imaging reader may not recognize and/or understand why adequate images cannot be obtained. For example, they may not recognize that positioning an imaging reader, which can only focus and/or image down to two inches, one inch from a target is too close. Such situations may lead to frustration and/or dissatisfaction.

SUMMARY

Thus, there is a need for easy to understand out-of-range indications. Disclosed methods and apparatus provide out-of-range indications that indicate when the distance to a target is outside the working range of the imaging reader. Such indications alert an operator that they need to reposition the imaging reader relative to the target and/or the target relative to the imaging reader. For example, further away if too close, or closer if too far away. Because the distance to a target may be determined even when autofocus and/or an acceptable image quality cannot be achieved, it is possible to provide an out-of-range indication to alert an operator to an out of working range condition even when autofocus and/or an acceptable image quality cannot be achieved. The operator can, in response to the indication, re-position the imaging reader further away from or closer to a target and/or the target further away from or closer to the imaging reader. Example out-of-range indications include, but are not limited to, a sound, a blink and/or change (e.g., color) to an indicator light, an illumination light, a visible aiming light pattern, etc.

In an embodiment, an imaging reader may include an image sensor and an optical assembly. The image sensor may be configured to receive an image of a target and to generate an image frame representative of the image of the target. The optical assembly may be configured to form the image of the target on the image sensor. The imaging reader may include a distance determining module configured to determine a distance to the target. The imaging reader may include an indication determining module configured to determine an out-of-range indication when the distance satisfies a first condition. The imaging reader may include an indicator configured to present the out-of-range indication. The image sensor may be configured to capture a representation of the image of the target when the distance satisfies a second condition. The imaging reader may include an indicia decoder configured to decode an indicia in the representation to determine an indicia payload. The imaging reader may include a communication interface to convey the indicia payload to a host system.

In one or more variations of the current embodiment, the imaging reader may include one or more processors, and one or more computer-readable memories storing computer-readable instructions that, when executed by the one or more processors, implement the distance determining module and the indication determining module.

In one or more variations of the current embodiment, the imaging reader may include an autofocus component configured to implement the distance determining module.

In one or more variations of the current embodiment, the out-of-range indication includes at least one of a light, a sound, or a haptic.

In one or more variations of the current embodiment, the out-of-range indication indicates the imaging reader is too close to the target or too far from the target.

In one or more variations of the current embodiment, the indication determining module may be configured to determine the out-of-range indication to be at least one of periodic, continual, or varying based upon the distance.

In one or more variations of the current embodiment, the indication determining module may determine the distance satisfies the first condition when the distance is outside of a working range of the imaging assembly.

In one or more variations of the current embodiment, the indication determining module may determine the distance satisfies the first condition when the distance is less than a first threshold or greater than a second threshold.

In one or more variations of the current embodiment, the indication determining module may determine the distance satisfies the first condition when the distance is less than a minimum focus distance of the imaging assembly.

In one or more variations of the current embodiment, the indication determining module may determine the first condition based upon a type of the indicia or the target.

In one or more variations of the current embodiment, the indication determining module may determine the distance using at least one of acoustic ranging, ultrasonic ranging, infrared ranging, or time-of-flight.

In one or more variations of the current embodiment, the distance determining module may be configured to determine the distance by determining an amount of parallax.

In one or more variations of the current embodiment, the indicia is a direct product mark (DPM) indelibly formed on an object.

In another embodiment, a computer-implemented method for providing an out-of-range indication at an imaging reader includes determining a distance to a target, and determining an out-of-range indication when the distance is outside of a working range of the optical assembly. The method may include presenting the out-of-range indication. The method may include capturing, using an image sensor, a representation of an image of the target when the distance is inside the working range. The method may include decoding an indicia in the representation to determine an indicia payload. The method may include conveying the indicia payload to a host system.

In one or more variations of the current embodiment, the out-of-range indication may include at least one of a light, a sound, or a haptic.

In one or more variations of the current embodiment, the out-of-range indication may be at least one of periodic, continual, or varying based upon the distance.

In one or more variations of the current embodiment, the method may further comprise determining the working range based on a type of the indicia or the target.

In one or more variations of the current embodiment, determining the distance may include using at least one of acoustic ranging, ultrasonic ranging, infrared ranging, or time-of-flight.

In one or more variations of the current embodiment, determining the distance may include determining an amount of parallax.

In yet another embodiment, a system for providing an out-of-range indication may include a host system and an imaging reader. The imaging reader may include a distance determining module configured to determine a distance to a target. The imaging reader may include an indication determining module configured to determine an out-of-range indication when the distance satisfies a first condition. The imaging reader may include an indicator configured to present the out-of-range indication. The imaging reader may include an imaging assembly configured to capture a representation of an image of the target when the distance satisfies a second condition. The imaging reader may include an indicia decoder configured to decode an indicia in the representation to determine an indicia payload, and convey the indicia payload to the host system.

BRIEF DESCRIPTION OF THE DRAWINGS

In the accompanying figures, like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

Skilled artisans will appreciate that elements in the figures are illustrated for simplicity and clarity and may not have necessarily been drawn to scale. For example, the dimensions of some of the elements in the figures may be exaggerated relative to other elements to help to improve understanding of examples of the invention.

Disclosed methods and apparatus have been represented where appropriate by conventional symbols in the drawings, showing only those specific details that are pertinent to understanding the examples of the invention so as not to obscure the disclosure with details that will be readily apparent to those of ordinary skill in the art having the benefit of the description herein. Skilled artisans will readily recognize from the following discussion that alternate examples of the assemblies and methods illustrated herein may be employed without departing from the principles set forth herein.

DETAILED DESCRIPTION

Reference will now be made in detail to non-limiting examples, some of which are illustrated in the accompanying drawings.

Figure 1:
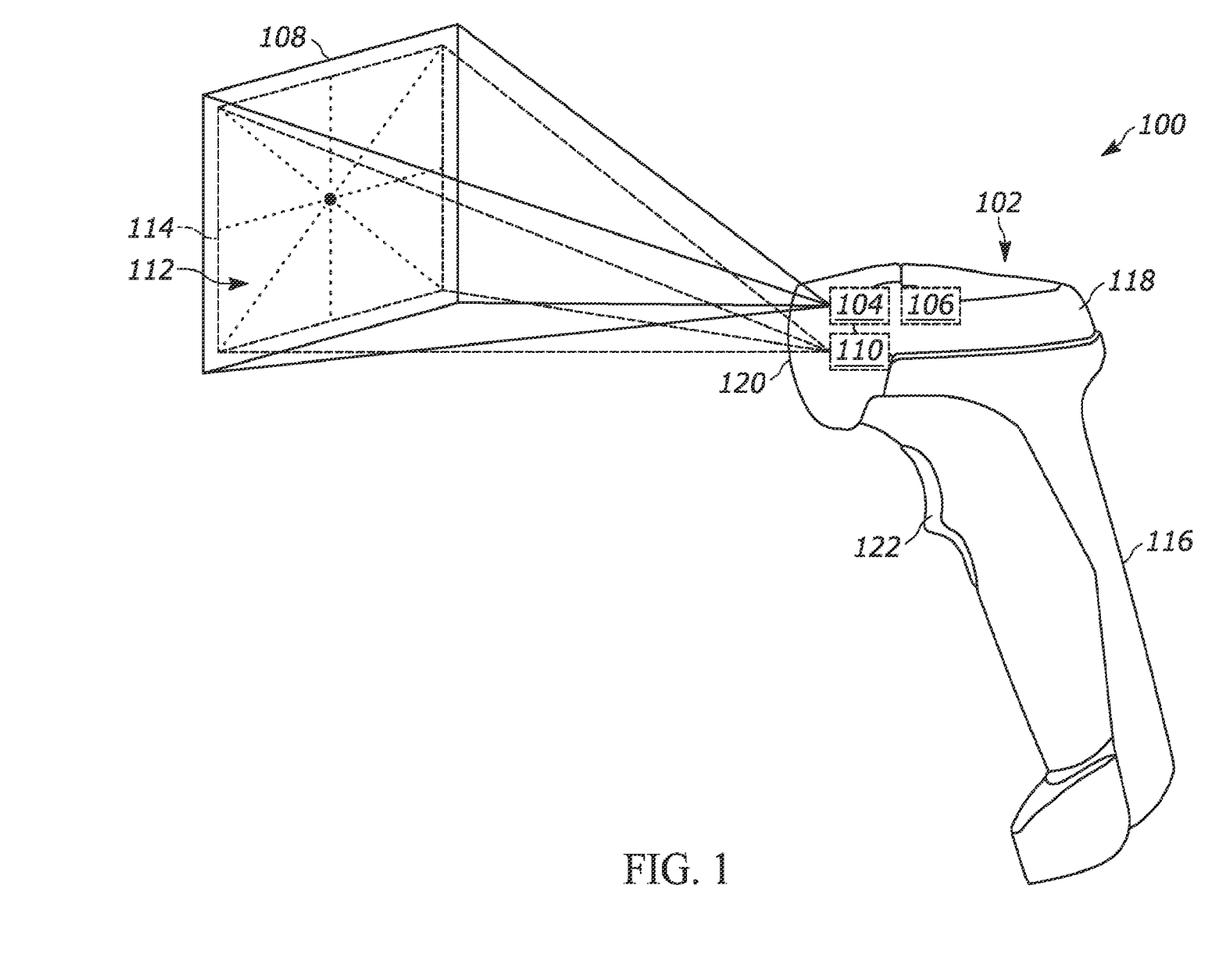
FIG. 1 is a perspective view of an example imaging reader, in accordance with embodiments of the disclosure.

FIG. 1 illustrates an example handheld imaging reader 100 configured to, among possibly other things, electro-optically read targets, such as barcode symbols, indicia, DPMs or the like. The imaging reader 100 includes an example housing 102 in which an imaging assembly 104 and an example out-of-range indicator 106 are mounted, in accordance with aspects of this disclosure. The imaging assembly 104 reads targets in an imaging FOV 108, and an example aiming pattern generator 110 generates an illuminated aiming pattern 112 in an aiming zone 114. The imaging FOV 108 and the aiming zone 114 may be, but need not be the same. For example, the aiming zone 114 may intentionally be smaller than the imaging FOV 108 to accommodate inaccuracies in imaging reader 100 handling. However, in general, the aiming pattern 112 and/or the aiming zone 114 are intended to visually aid a user when, for example, the user is positioning and/or aiming the imaging reader 100 and/or positioning a target so the target falls within the imaging reader's FOV 108 (e.g., within a central region of the FOV).

The example housing 102 of FIG. 1 includes a generally elongated handle or lower handgrip portion 116 and a barrel or upper body portion or top 118 having a front end at which a light-transmissive window 120 is located. The cross-sectional dimensions and overall size of the handle 116 are such that the imaging reader 100 can be conveniently held in an operator's hand. The body and handle portions 116, 118 may be constructed of a lightweight, resilient, shock-resistant, self-supporting material, such as a synthetic plastic material. The housing 102 may be injection molded, but can also be vacuum-formed or blow-molded to form a thin hollow shell which bounds an interior space whose volume is sufficient to contain the various components of this imaging reader 100. A manually actuatable trigger 122 is mounted in a moving relationship on the handle 116 in a forward facing region of the imaging reader 100. An operator's finger can be used to actuate the trigger 122 to read a target by depressing the trigger 122 once the target falls within the illuminated aiming zone 114, which represents the imaging FOV 108. Although the housing 102 is illustrated as a portable, point-of-transaction, gun-shaped, hand-held housing, any other configuration including a hands-free configuration could be used.

The imaging reader 100 includes the out-of-range indicator 106 to indicate whether a target in the imaging FOV 108 lies within the working range of the imaging assembly 104 and/or, more generally, the imaging reader 100. The output of the out-of-range indicator 106 changes based on whether or not a target in the imaging FOV 108 satisfies one or more conditions, for example, lies within the working range of the imaging assembly 104. For example, the distance is greater than a first threshold corresponding to a minimum working distance, and less than a second threshold corresponding to a maximum working distance. In an example, the out-of-range indicator 106 is a light emitting diode (LED) on the housing 102. When the target lies within the working range, the LED may emit a green light, but emit a red light when the target does not lie within the working range. In another example, the aiming pattern generator 110 is used as the out-of-range indicator 106. When the target lies within the working range, the illuminated aiming pattern 112 is steady, but flickers when the target does not lie within the working range. In still another example, an illumination light source is used as the out-of-range indicator 106. When the target lies within the working range, illumination light emitted by the illumination light source is steady, but flickers when the target does not lie within the working range. In still another example, a sound output device is used as the out-of-range indicator 106. When the target lies within the working range, the sound output device does not emit any sound, but outputs a sound when the target does not lie within the working range. In yet another example, a haptic output device is used as the out-of-range indicator 106. When the target lies within the working range, the haptic output device does not emit any vibrations, but outputs a vibration when the target does not lie within the working range.

Additionally and/or alternatively, the out-of-range indicator 106 may have an output that varies with an extent by which a target is outside the working range. In an example, as a target nears and enters the working range, an LED changes from emitting red light to emitting yellow light to emitting green light. In another example, the rate at which light blinks indicates how close the target is to the working range. For instance, light is blinked slowly when the target is far from the working zone, increases as the target nears the working zone, and changes to steady when the target enters the working zone.

Additionally and/or alternatively, an out-of-range indicator 106 may be implemented by a device, system, etc. communicatively coupled to the imaging reader 100. For example, an out-of-range indicator 106 in the form of a sound output device may be implemented by a host system communicatively coupled to an imaging reader 100.

The imaging reader 100 determines the distance to a target in the imaging FOV 108, and uses the distance to determine whether and/or what out-of-range indication should be presented by the out-of-range indicator 106. The distance may be determined using any number and/or type(s) of methods, algorithms, techniques, etc. For example, the distance may be determined using acoustic ranging, ultrasonic ranging, infrared ranging, and/or a time-of-flight determination. When, for example, the aiming axis of the aiming pattern generator 110 is not coaxial with the optical axis of the imaging assembly 104, then the center of the illuminated aiming pattern 112 will be offset from the center of the imaging FOV 108 due to parallax. The amount and/or direction of the offset varies with the distance to a target can, thus, be used to determine the distance to the target. The determined distance can be compared to the minimum working distance and/or the maximum working distance as threshold(s) to determine whether and/or what out-of-range indication should be presented by the out-of-range indicator 106. In some examples, whether and/or what out-of-range indication to present depends on a type of the target. For instance, because a barcode may be comprised of spaced-apart black lines on a white background, a barcode may be decodable in a somewhat out-of-focus image at a greater distance, but may not be decodable at a closer distance where the width of the barcode exceeds the FOV of the imaging reader. In contrast, because DPMs are often smaller and may contain small features with less contrast, a DPM may be decodable at closer distances but may not be decodable at larger distances Thus, if a target is identified to be a barcode, the working range can be set to be further away and larger (e.g., from two-half inches to two hundred inches) than when a DPMs is identified (e.g., one and one-half inches to forty hundred inches). Additionally and/or alternatively, an autofocus component (e.g., see FIG. 2) may determine the distance. For example, when the focus of the imaging assembly 104 has been moved to its shortest focus limit and/or its longest focus limit, it can be determined that the target is outside the working range.

In an embodiment, a machine vision system may be implemented in accordance with aspects of the imaging reader 100. For example, a processor (e.g., see FIG. 2) of the machine vision system can be used to control a conveyor, an assembly line, etc. until one or more targets to be read fall within the aiming zone 114, and then automatically trigger reading of the target(s) by the imaging assembly 104. For example, the out-of-range indicator 106 may, instead of presenting an out-of-range indication to a user, output the out-of-range indication as an input for the processor. The processor may use the out-of-range indication input to determine control of the conveyor, an assembly line, etc. until one or more targets to be read fall within the working range.

While an example imaging reader 100 is illustrated in FIG. 1, one or more of the aspects illustrated in FIG. 1 may be combined, divided, re-arranged, omitted, eliminated and/or implemented in any other way. Further, the imaging reader 100 may include one or more aspects in addition to, or instead of, those illustrated in FIG. 1, and/or may include more than one of any or all of the illustrated aspects. For example, the imaging reader 100 may be in wired or wireless communication with a computing system or server.

Figure 2:
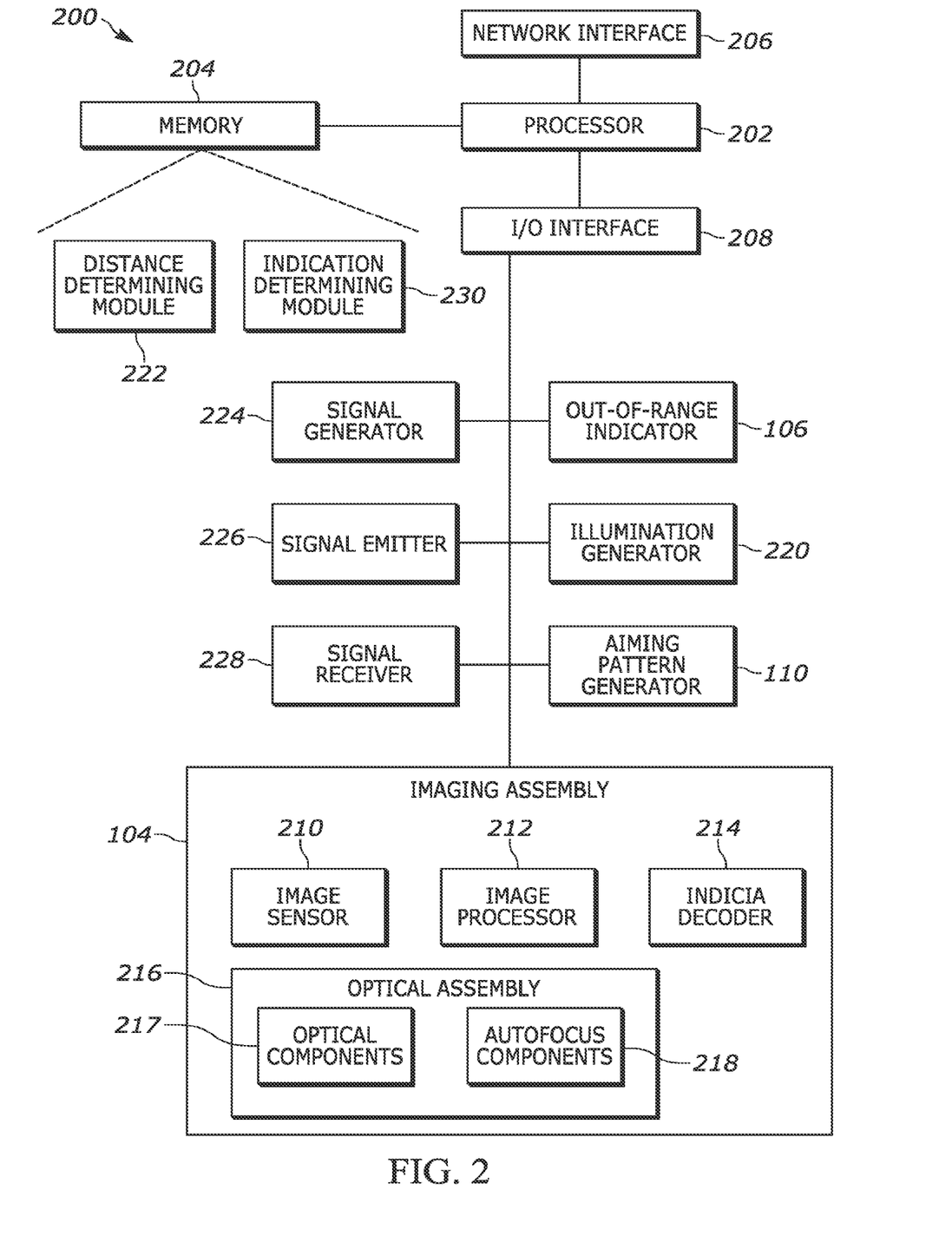
FIG. 2 is a block diagram of an example imaging reader, in accordance with embodiments of the disclosure.

FIG. 2 is a block diagram representative of an example logic circuit capable of implementing an imaging reader 200 (e.g., the imaging reader 100 of FIG. 1) and/or a device, system, etc. based thereon. The example imaging reader 200 includes a processing platform capable of executing instructions to, for example, implement operations of the example methods described herein. Other example logic circuits capable of, for example, implementing operations of the example methods described herein include field programmable gate arrays (FPGAs) and application specific integrated circuits (ASICs).

The example imaging reader 200 of FIG. 2 includes a processor 202 such as, for example, one or more microprocessors, controllers, and/or any suitable type of processor. The example imaging reader 200 of FIG. 2 includes any number or types of non-transitory memory 204 (e.g., volatile memory, non-volatile memory, etc.) and/or storage devices accessible by the processor 202 (e.g., via a memory controller) in which information may be stored for any duration (e.g., permanently, for an extended time period, for a brief instance, for temporarily buffering, for caching of the information, etc.). The example processor 202 interacts with the memory 204 to obtain, for example, computer- and/or machine-readable instructions stored in the memory 204 corresponding to, for example, the operations disclosed herein. Additionally or alternatively, computer- and/or machine-readable instructions corresponding to the example operations described herein may be stored on one or more removable media (e.g., an optical storage drive, a compact disc (CD), a digital versatile disk (DVD), a removable flash memory, etc.) that may be coupled to the imaging reader 200 to provide access to the computer- and/or machine-readable instructions stored thereon.

The example imaging reader 200 of FIG. 2 includes one or more communication interfaces such as, for example, a network interface 206 and/or an input/output (I/O) interface 208. The communication interface(s) enable the imaging reader 200 to communicate with, for example, a host system. The network interface 206 enables communication with other machines via, for example, one or more networks. The example network interface 206 includes any suitable type of wired and/or wireless network interface(s) configured to operate in accordance with any suitable protocol(s) like, for example, a TCP/IP interface, a Wi-Fi™ transceiver (according to the IEEE 202.11 family of standards), an Ethernet transceiver, a cellular network radio, a satellite network radio, a coaxial cable modem, a digital subscriber line (DSL) modem, a dialup modem, or any other suitable communication protocols or standards.

The I/O interfaces 208 (e.g., the trigger 122) to enable receipt of user input and communication of output data to the operator. The I/O interfaces 208 may include any number and/or type(s) of different types of I/O circuits or components that enable the processor 202 to communicate with peripheral I/O devices. Example I/O interfaces 208 include a universal serial bus (USB) interface, a Bluetooth® interface, a near field communication (NFC) interface, a serial interface, and/or an infrared transceiver. The peripheral I/O devices may be any desired type of I/O device such as a keyboard, a display, a navigation device (e.g., a mouse, a trackball, a capacitive touch pad, a joystick, etc.), a speaker, a microphone, a printer, a button, etc.

To capture image frames representative of targets in a FOV (e.g., the imaging FOV 108), the example imaging reader 200 includes the example imaging assembly 104 (see FIG. 1). The imaging assembly 104 includes any number and/or type(s) of image sensor 210 under control of, for example, an image processor 212 to capture image frames representative of the portion of an environment in which the imaging reader 200 is operating that falls within an imaging FOV of the imaging assembly 104. The image sensor 210 includes a plurality of photosensitive elements forming a substantially flat surface.

When targets may include indicia, barcodes, DPMs, etc., the imaging assembly 104 may implement any number and/or type(s) indicia decoder 214 to detect and/or decode indicia, barcodes, DPMs, etc. to determine the payload of the indicia, barcodes, DPMs, etc. In some examples, the indicia decoder 214 is implemented by the processor 202 or the image processor 212. The indicia decoder 214 conveys the payload of decoded indicia, barcodes, DPMs, etc. to a host system via a communication interface such as the network interface 206 and/or the I/O interface(s) 208.

The imaging assembly 104 includes an optical assembly 216 to form images of targets in a FOV on the surface of the image sensor 210. The optical assembly 216 may include any number and/or type(s) of optical elements and/or components 217 including, for example, one or more lenses, filters, focus motors, apertures, lens holder, liquid lenses, or any other components and/or optical elements.

In some examples, to focus the optical assembly 216 on a target, the imaging assembly 104 may include any number and/or type(s) of autofocus components 218 (e.g., motors, liquid lenses, etc.). In some examples, some of the autofocus components 218 (e.g., an autofocus controller) are implemented by the processor 202 or the image processor 212. Alternatively, the optical assembly 216 is a fixed focus optical assembly.

To generate illuminated aiming patterns, such as the pattern 112 of FIG. 1, the example imaging reader 200 includes the example aiming pattern generator 110. An example aiming pattern generator 110 includes one or more light sources (e.g., lasers, LEDs, etc.) and one or more elements (e.g., one or more apertures, one or more diffractive and/or refractive elements, etc.). The light source(s) generate light that is passed through the element(s) to provide a clear illuminated aiming pattern.

To illuminate a target to be imaged, the example imaging reader 200 may include any number and/or type(s) illumination generator 220. The illumination generator 220 emits light in a FOV to, for example, facilitate autofocusing and/or improve the quality of image frames captured by the image sensor 210.

To indicate whether a target in an imaging FOV lies within the working range of the imaging assembly 104 and/or, more generally, the imaging reader 200, the example imaging assembly 104 includes the example out-of-range indicator 106. The output of the out-of-range indicator 106 is turned on, changed, modified, etc. based on whether or not a target in an imaging FOV satisfies one or more conditions, for example, lies within the working range of the imaging assembly 104. For example, whether the distance is greater than a first threshold corresponding to a minimum working distance, and whether the distance is less than a second threshold corresponding to a maximum working distance. As described above in connection with FIG. 1, the out-of-range indicator 106 may be an LED, a sound output device, a haptic output device, etc. Additionally and/or alternatively, the out-of-range indicator 106 may be implemented by the aiming pattern generator 110 and/or the illumination generator 220. Additionally and/or alternatively, as described above in connection with FIG. 1, the out-of-range indicator 106 may have an output that varies with an extent by which a target is outside the working range.

To determine the distance to a target in a FOV, the example imaging reader 200 includes a distance determining module 222. In the illustrated example of FIG. 2, the distance determining module 222 is implemented as a program, module, etc. of computer- and/or machine-readable instructions stored on the memory 204 and executed by the processor 202. Additionally and/or alternatively, the image processor 212 and/or the autofocus components 218 may implement the distance determining module 222. The distance determining module 222 may determine a distance using any number and/or type(s) of methods, algorithms, techniques, etc. For example, the distance determining module 222 may control a signal generator 224, a signal emitter 226 and a signal receiver 228 to determine a distance using acoustic ranging, ultrasonic ranging and/or a time-of-flight determination. When, for example, the aiming axis of the aiming pattern generator 110 is not coaxial with the optical axis of the imaging assembly 104, then the center of the illuminated aiming pattern 112 will be offset from the center of imaging FOV 108 due to parallax. The amount and/or direction of the offset varies with the distance to a target and can, thus, be used by the autofocus components 218 to determine the distance from the target to the imaging assembly 104. Accordingly, the autofocus components 218, which is implementing the distance determining module 222, may determine the amount and/or direction of the offset between the center of the illuminated aiming pattern 112 and the center of the imaging FOV 108. The autofocus components 218 may then determine the distance to a target based on the determined amount and/or direction of the offset. For example, if the axes and relative positions of the optical assembly 116 and the aiming system 110 are tightly controlled, the relationship between the apparent location in the image of the aiming centroid and the distance from the optical assembly 116 to the plane that aiming pattern is projected on are repeatable and easily calculated from design data. However, this tight control can be an issue in the manufacturing environment. With less strict control, capturing a calibration image at a known distance allows the variation in relative axis direction between the optical assembly 116 and aiming system 110 to be determined. The other variable, the relative positions of the optical components 217 and the aiming pattern generator 110 is fixed by their installation in the housing 102. Knowing the start points of the optical and aiming axes (from the design) and the end points in the image at a known distance provides the data needed to calculate the parallax expected. This calibration image can be used to calibrate the calculation of distance. Additionally and/or alternatively, distance determining module 222, when the focus of the imaging assembly 104 has been moved to its shortest focus limit and/or its longest focus limit, may determine that the target is outside the working range.

To determine an out-of-range indication to present, the example imaging reader 200 includes an example indication determining module 230. In the illustrated example of FIG. 2, the indication determining module 230 is implemented as a program, module, etc. of computer- and/or machine-readable instructions stored on the memory 204 and executed by the processor 202. Additionally and/or alternatively, the image processor 212 and/or the autofocus components 218 may implement the indication determining module 230. The indication determining module 230 compares the distance determined by the distance determining module 222 to the minimum working distance and/or the maximum working distance as threshold(s) to determine whether and/or what out-of-range indication should be presented by the out-of-range indicator 106. In some examples, whether and/or what out-of-range indication to present depends on a type of the target. For instance, a barcode may be decodable in a image taken at one and one half inches, while a DPM can only be decoded from an image taken from at least two inches.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored computer- or machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes computer- or machine-readable instructions to perform operations (e.g., one or more of the operations described herein and/or represented by the flowcharts of this disclosure, if such are present). Some example logic circuits include a combination of specifically configured hardware and hardware that executes computer- or machine-readable instructions. The above description refers to various operations described herein and/or flowcharts that may be appended hereto to illustrate the flow of those operations. Any such descriptions and/or flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by computer- or machine-readable instructions (e.g., software and/or firmware) stored on a medium (e.g., a tangible computer- or machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and computer- or machine-readable instructions stored on a medium (e.g., a tangible computer- or machine-readable medium) for execution by logic circuit(s).

Figure 3:
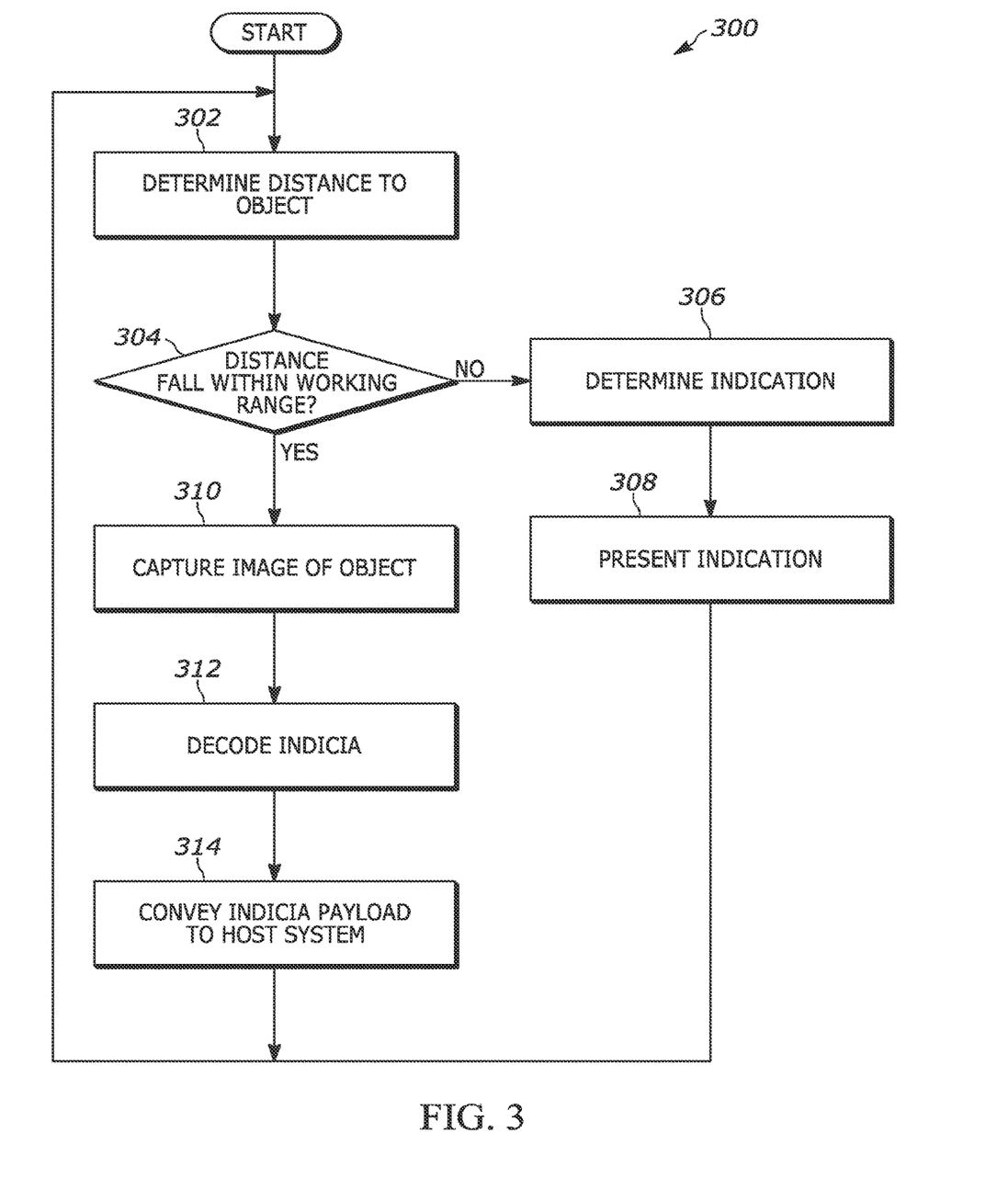
FIG. 3 is a flowchart representative of example methods, hardware logic and/or machine-readable instructions for providing out-of-range indications, in accordance with embodiments of the disclosure.

FIG. 3 is a flowchart 300 representative of example processes, methods, software, computer- or machine-readable instructions, etc. for implementing the imaging reader 100 of FIG. 1 and/or the imaging reader 200 of FIG. 2. The processes, methods, software and instructions may be an executable program or portion of an executable program for execution by a processor such as the processor 202 of FIG. 2. The program may be embodied in software or instructions stored on a non-transitory computer- or machine-readable storage medium such as a CD, a hard drive, a DVD, a Blu-ray disk, a cache, flash memory, read-only memory (ROM), random access memory (RAM), a ROM (Read Only Memory), a PROM (Programmable Read Only Memory), an EPROM (Erasable Programmable Read Only Memory), an EEPROM (Electrically Erasable Programmable Read Only Memory), or any other storage device or storage disk associated with the processor 202 in which information is stored for any duration (e.g., for extended time periods, permanently, for brief instances, for temporarily buffering, and/or for caching of the information). Further, although the example program is described with reference to the flowchart 300 illustrated in FIG. 3, many other methods of implementing an imaging reader may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, a PLD, an FPGA, an FPLD, a logic circuit, etc.) structured to perform the corresponding operation without executing software or instructions.

The example flowchart 300 of FIG. 3 begins with an imaging reader (e.g., the distance determining module 222) determining the distance to a target (block 302). The imaging reader (e.g., the indication determining module 230) determines whether the distance satisfies one or more conditions (e.g., falls within the working distance of the imaging reader) (block 304). If the distance does not satisfy the one or more conditions (block 304), the indication determining module 230 determines what out-of-range indication to display, as described above in connection with FIGS. 1 and 2 (block 306). The imaging reader (e.g., the out-of-range indicator 106) presents the indication (block 308). Control then returns to block 302 to determine the distance to a target.

Returning to block 304, if the distance satisfies the one or more conditions (block 304), the imaging reader (e.g., the image sensor 210) captures an image of the target (block 310). If the target is determined as an indicia, barcode, DPM, etc. the imaging reader (e.g., the indicia decoder 214) decodes the indicia, barcode, DPM, etc. (block 312) and conveys the payload of the decoded indicia, barcode, DPM, etc. to a host computer via, for example, a communication interface (e.g., the network interface 206 and/or the I/O interface(s) 208) (block 314). Control then returns to block 302 to determine the distance to a target.

It will be appreciated that some embodiments may be comprised of one or more generic or specialized processors (or "processing devices") such as microprocessors, digital signal processors, customized processors, FPGAs and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more ASICs, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk drive (HDD), a compact disc read only memory (CD-ROM), an optical storage device, a magnetic storage device, a ROM, a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, A, B or C refers to any combination or subset of A, B, C such as (1) A alone, (2) B alone, (3) C alone, (4) A with B, (5) A with C, (6) B with C, and (7) A with B and with C. As used herein, the phrase "at least one of A or B" is intended to refer to implementations including any of (1) at least one A, (2) at least one B, and (3) at least one A and at least one B. Similarly, the phrase "at least one of A and B" is intended to refer to implementations including any of (1) at least one A, (2) at least one B, and (3) at least one A and at least one B. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

As used herein, the expressions "in communication," "coupled" and "connected," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computer-implemented method for providing an out-of-range indication at an imaging reader, the method comprising:
    determining, via a distance determining module and an autofocus component, a distance to a target;
    determining an out-of-range indication when the distance is outside of a working range of the optical assembly;
    presenting the out-of-range indication, the out-of-range indication being a varying out-of-range indication that varies based on the distance;
    capturing, using an image sensor, a representation of an image of the target when the distance is inside the working range;
    decoding an indicia in the representation to determine an indicia payload; and
    conveying the indicia payload to a host system.

2. The method of claim 1, wherein the out-of-range indication includes at least one of a light, a sound, or a haptic.

3. The method of claim 1, wherein the out-of-range indication is at least one of periodic, continual, or varying based upon the distance.

4. The method of claim 1, further comprising determining the working range based on a type of the indicia or the target.

5. The method of claim 1, wherein determining the distance includes using at least one of acoustic ranging, ultrasonic ranging, infrared ranging, or time-of-flight.

6. The method of claim 1, wherein determining the distance includes determining an amount of parallax.

7. A system for providing an out-of-range indication, the system comprising:
    a host system; and
    an imaging reader including:
    an optical assembly configured to form the image of a target on an imaging assembly,
        a distance determining module configured to determine a distance to the target,
    an autofocus component configured to implement the distance determining module,
        an indication determining module configured to determine an out-of-range indication when the distance satisfies a first condition,
        an indicator configured to present the out-of-range indication, the out-of-range indication being a varying out-of-range indication that varies based on the distance,
        wherein the imaging assembly is configured to capture a representation of an image of the target when the distance satisfies a second condition, and
        an indicia decoder configured to decode an indicia in the representation to determine an indicia payload and convey the indicia payload to the host system.

* * * * *